United States Patent [19]

Shanley

[11] Patent Number: 5,188,038
[45] Date of Patent: Feb. 23, 1993

[54] RAILROAD CAR DERAILMENT SAFETY DEVICE

[76] Inventor: Thomas E. Shanley, 14 DeForest St., Binghamton, N.Y. 13901

[21] Appl. No.: 848,519

[22] Filed: Mar. 9, 1992

Related U.S. Application Data

[63] Continuation-in-part of Ser. No. 653,219, Feb. 11, 1991, abandoned.

[51] Int. Cl.⁵ .............................................. B60T 17/00
[52] U.S. Cl. .................................... 105/216; 105/217; 104/242; 188/34; 188/151 A; 303/1
[58] Field of Search ............... 303/1, 9; 105/216, 217; 104/242; 188/38, 33, 34, 151 A

[56] References Cited

U.S. PATENT DOCUMENTS

| | | | |
|---|---|---|---|
| 895,935 | 8/1908 | Andrew | 105/216 |
| 1,462,254 | 7/1923 | Votau | 105/216 |
| 3,535,511 | 10/1970 | Foster | 105/216 |
| 3,645,211 | 2/1972 | Gretzschel | 104/242 |
| 3,881,672 | 5/1975 | Gittard | 105/217 |
| 4,269,288 | 5/1981 | Collins | 188/33 |
| 4,339,997 | 7/1982 | Chiles | 188/33 X |

Primary Examiner—Joseph F. Peters, Jr.
Assistant Examiner—Christopher P. Ellis
Attorney, Agent, or Firm—Salzman & Levy

[57] ABSTRACT

The present invention features a safety device that activates the air-brake system immediately upon the detection and/or occurrence of a railroad car derailment condition. The safety device includes a bar entension disposed beneath each car of a train. The extension bar is disposed transverse to the parallel rails and is positioned a few (approximately four) inches above them. When any one of the cars is caused to derail, the extension bar contacts the rail, causing a trip valve in the air-brake line to open. The opening of the trip valve gradually releases the air pressure in the line, thus automatically and instantaneously actuating the air-brake system throughout the train. The gradual release of the air pressure in the air-brake system provides more time for the engineer of the train to bring the train under control and reduces the possibility of damage and injury caused by the derailment.

20 Claims, 6 Drawing Sheets

000
RAILROAD CAR DERAILMENT SAFETY DEVICE

This is a continuation-in-part of copending application(s) Ser. No. 07/653,219, filed on Feb. 11, 1991, now abandoned.

FIELD OF THE INVENTION

The present invention relates to railway safety devices and systems, and, more particularly, to a railway car safety device that reduces the amount of damage incurred during and/or after an impending wreckage or derailment.

BACKGROUND OF THE INVENTION

To date almost all efforts to minimize the likelihood of train derailments have concentrated on the maintenance of railway tracks. Unfortunately, this is largely impossible to achieve, due to the thousands of miles of track that must be kept in continuous repair, temperature extremes notwithstanding. Rails are known to expand (run) with heat and contract with cold, which often results in broken bolts, angle irons and even rails themselves. It is, therefore, understandable that no device or system has ever been able to eliminate derailments.

The present invention reflects the conclusion that derailments will always happen, despite all the precautionary devices and efforts made toward eliminating them. Because derailments are inevitable, the second-best objective would be to keep damage and injury to a minimum in any future calamity. Derailments may be inevitable, but the ensuing wreckage can be minimized or even, on occasion, prevented.

After the cars of a train begin to derail, many times the train continues forward for many miles, because detection is delayed for a critical amount of time. Due to the way that railroad tracks are structured, an accident will usually occur at a location most likely to induce the worst damage; such locations are usually at switches, signals, bridge abutments and adjacent track which carry on-coming trains. The vehicles subsequently rip up track, endanger lives and damage any surrounding signals, switches, cars and cargo. Tank cars carrying hazardous chemicals or toxic waste are likely to be ruptured by the derailment, thus spewing their dangerous cargoes.

Train cars are coupled together by large iron knuckles. Beneath these knuckles are situated two hoses of the air-brake system that are connected by conduit throughout the train. The air-brake system is under constant pressure. It is only when the pressure is released that the brakes are applied. When railroad cars derail, the hoses and conduits carrying the compressed air do not always rupture. Only a collision or a voluntary pulling of the emergency cord will activate the air-brake system. Such a system cannot prevent large-scale damage.

As one of its main objectives, the present invention seeks to provide a new safety device that would immediately detect and limit damage and injury due to derailment of a railway vehicle. The invention seeks to alert the engineer immediately of the fact of a derailment and, simultaneously therewith, to initiate an immediate air pressure bleed-off in the braking system. The air pressure is gradually reduced to prevent jack-knifing, and the braking action is applied uniformly throughout the cars of the train. Upon the early sensing of a derailing car, the current invention automatically engages the air-brake system, thus bringing all the cars of the train to a gradual halt. In this manner, impending large wrecks can be avoided and extensive damage curtailed or prevented.

In other words, the invention forestalls or contains damage and injury at the first sign of a derailment problem.

Another objective or the current invention is to provide a device that is simple and reliable, as well as one which operates automatically upon, and in conjunction with, the existing air-brake system. The invention utilizes a skip-jack device to activate the brake system. The skip-jack is gravity force actuated, thus requiring no internal or external mechanism, circuit or power source. This simple gravity device ensures a more reliable activation of the braking system than do other such safety devices.

DISCUSSION OF RELATED ART

Current passenger train safety equipment features the emergency cord air-brake release system. This is a purely voluntary system that does not act automatically or instantaneously in the event of a derailment. Derailed cars can be dragged along the tracks for many miles before someone pulls the safety cord or even recognizes that a dangerous condition is present.

Where passenger safety is the primary concern and object of a braking system, it is imperative that there be a gradual stop in an emergency situation.

Another currently available train safety system contains a dragging equipment detector, which features a number of metal plates standing on end between the rails at select locations along the track's pathway. If any of these plates is knocked over by the passing of a train, a signal is relayed to a distant dispatcher. However, there are several circumstances (e.g., a loose piece of equipment hanging or dragging from the train) or even extraneous, unrelated events which can cause the disruption of these plates. The dispatcher has no way of determining what originally prompted the signal to be sent; the metal plates could be knocked over by dragging equipment or a derailment, for instance. This safety system is also nullified by external conditions such as heavy snowfall and accidental or deliberate tampering. Even if the dispatcher should intuitively guess that a dangerous condition is present, the air-brakes will be applied only after the train's conductor or engineer has been signalled. By then, much valuable time will have elapsed.

In contrast, the present skip-jack device of this invention immediately alerts the engineer, not the dispatcher. In the operation of this invention, it is the engineer who alerts the dispatcher to stop all trains in the area.

SUMMARY OF THE INVENTION

In accordance with the present invention, there is provided a safety device that activates the air-brake system immediately upon the detection and/or occurrence of a derailment condition. The safety device comprises a bar extension disposed beneath each car of a train. The extension bar is disposed midway between the front and rear wheels transverse to one of the rails. The bar is positioned a few (approximately four) inches above the rail. When any one of the cars derails, the extension bar contacts the rail and is forced upward, causing a trip valve in the air-brake line to open. The opening of the trip valve gradually releases the air pressure in the line, thus automatically and instantaneously actuating the air-brake system throughout the train. This drop in air pressure registers on the air pressure gauge in the engineer's cab. The engineer is thus alerted to the problem and has the opportunity to reduce the driving forces impelling the forward movement of the train. In other words, the engineer can reduce the power to the locomotive drive train. The attention of the engineer to the reduction in the brake system's air pressure can be enhanced by appropriate alarm mechanisms. Such mechanisms can be designed to provide an alarm when there is a drop of approximately five-to-ten pounds of pressure in the line.

BRIEF DESCRIPTION OF THE DRAWINGS

A complete understanding of the present invention may be obtained by reference to the accompanying drawings, when considered in conjunction with the subsequent, detailed description, in which.

For the sake of brevity and clarity, like elements and components will bear the same designation throughout the drawings.

DESCRIPTION OF THE PREFERRED EMBODIMENT

Generally speaking, the invention features a safety device for railway cars that automatically and instantaneously actuates the air-brake system upon the derailment of any one of the railway cars in the train. The safety device comprises a bar extension disposed over the rails under each car. When any one of the cars is caused to derail, its bar extension will contact the rail over which it is disposed. This, in turn, will cause the opening of a trip valve and the subsequent, gradual release of air pressure in the air-brake line. This gradual release of air pressure will permit a positive, uniform brake application throughout the train. Not only will the gradual release of pressure allow a safer and more gradual braking to occur, but it will also provide more time for the engineer to bring the train under control. Thus, the amount of potential damage to the train and the rail system will be limited. The possibility of jack-knifing, run-ins and slack action of the cars will be greatly reduced. Also reduced will be the tremendous forces asserted upon the track, which a sudden stop at full speed induces.

Figure 1:
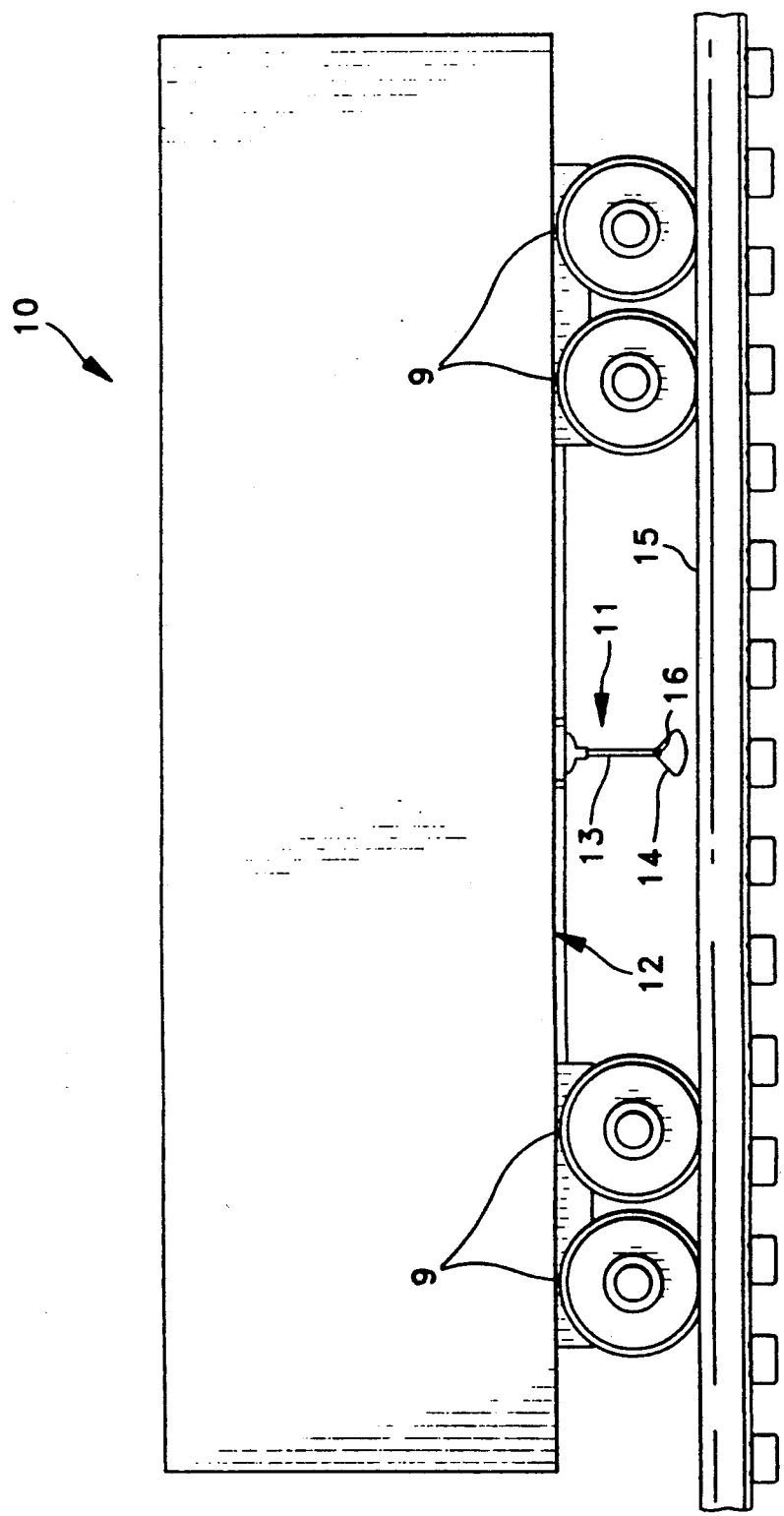
FIG. 1 is a schematic side view of a train railway car that is fitted with a skip-jack extension safety device of the invention.
Figure 2:
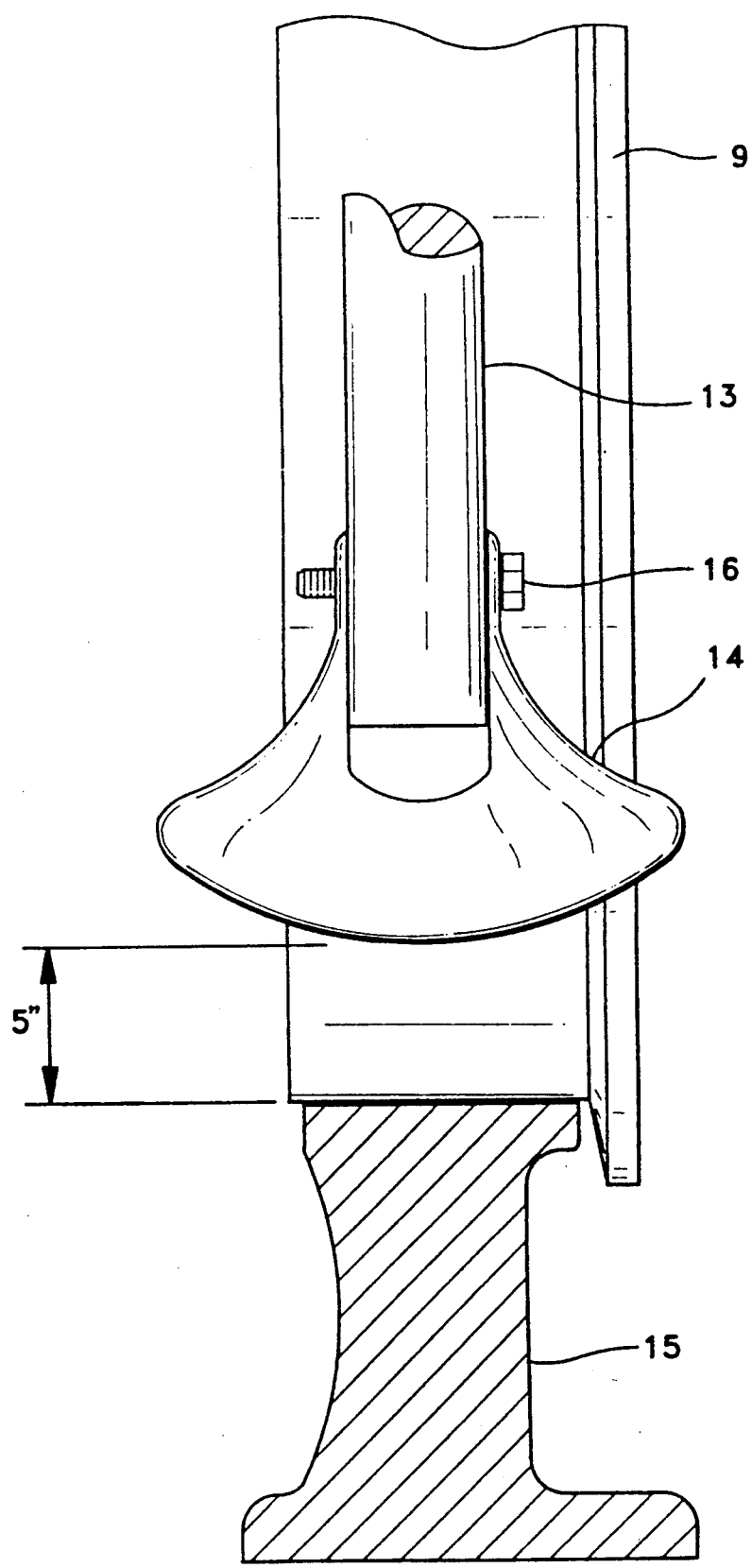
FIG. 2 is schematic partial front view of the skip-jack extension safety device of the railway car of FIG. 1, as observed looking along the railway track.
Figure 3:
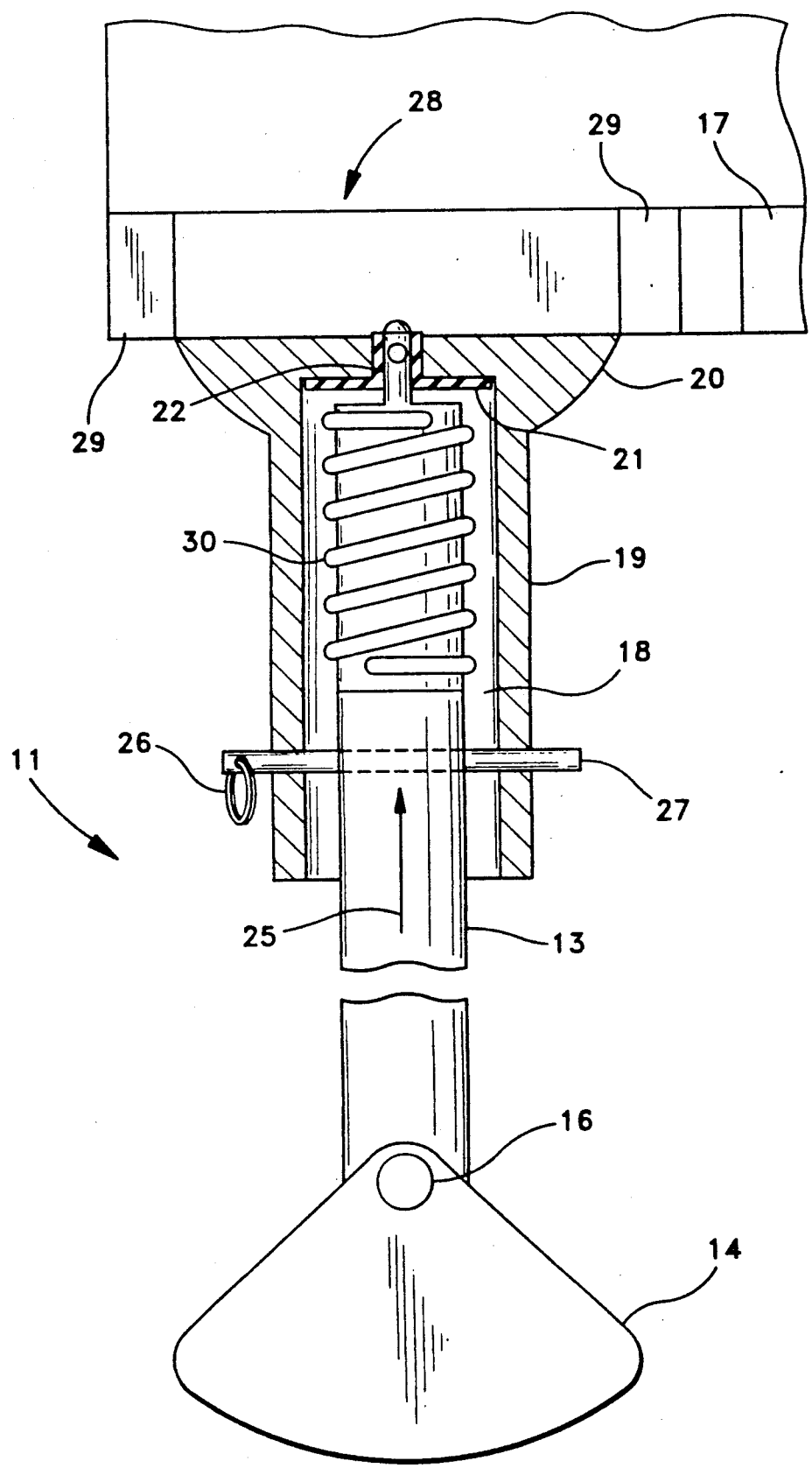
FIG. 3 is a schematic cutaway side view of the skip-jack extension safety device of this invention.

Now referring to FIG. 1, a typical railway car 10 is shown with standard wheels 9. The car 10 is depicted with a bar safety device 11 of this invention. The bar safety device 11 extends from the bottom 12 of the car 10 and comprises an elongated shaft 13. On the distal end of shaft 13 is carried a skip-jack 14 that is pivotally secured thereto by a bolt 16. The skip-jack 14, shown in better perspective in FIGS. 2 and 3, is disposed only a few (approximately four) inches above a rail 15 of the railway system. The skip-jack 1 is positioned substantially perpendicular to and across the rail 15. The skip-jack stirrup is four inches wider than the wheel, guaranteeing contact with the rail when the wheel drops.

Referring to FIG. 3, the bar safety device 11 of this invention is illustrated in greater detail. The skip-jack 14 is pivotable about shaft 13, as aforementioned. This ensures that contact with rail 15, while the car 10 is in motion, will cause an upward force upon the shaft 13, despite a lateral force component. The shaft 13 extending from the bottom 12 of the railway car 10 forms part of the air-brake conduit 17. The shaft 13 is disposed within a housing 18, comprising a sleeve 19 and a collar 20. The collar 20 has a hollow, cylindrical guide-bore with a gasket 21. The end 22 of shaft 13 is made to slide upwardly and be guided (arrow 25) into the bore 2 when the skip-jack 14 hits the rail 15 during a derailment of the railway car 10.

A coil spring 30 is disposed about shaft 13, within the sleeve 19 between the collar 20 and a safety release pin 27 that runs through the sleeve 19 and shaft 13, as shown. A ring 26 attached to the safety release pin 27 allows for removal of the shaft 13 and coil spring 30 from sleeve 19.

Figure 4:
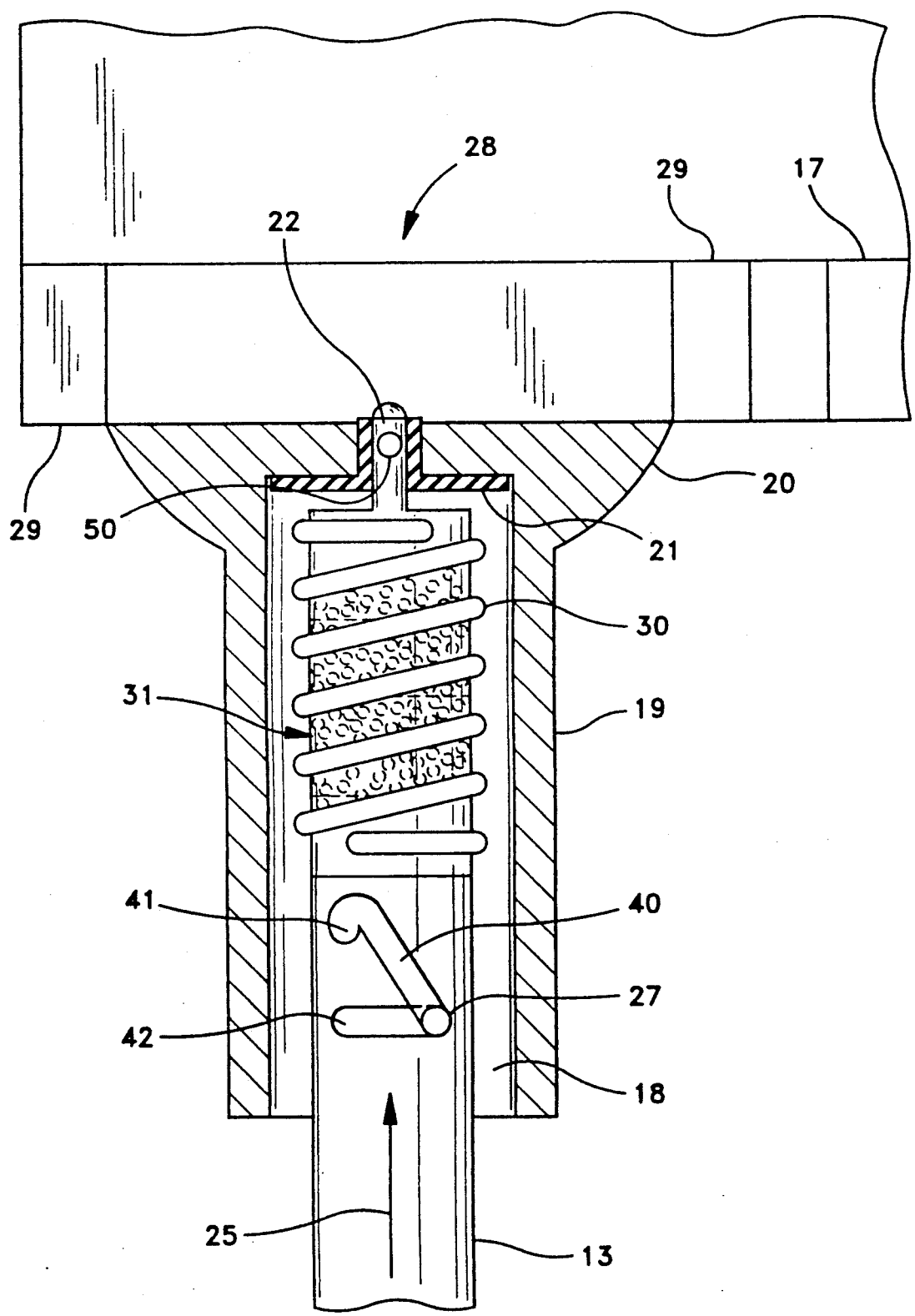
FIG. 4 is an enlarged schematic cutaway side view of the collar portion of the skip-jack extension safety device of the invention, as illustrated in FIG. 3.

The safety release pin 27 rides in a guide slot 40, as shaft 13 is forced upward (arrow 25), as illustrated in FIG. 4. At the top of guide slot 40 is disposed a locking aperture 41 that captures pin 2 at the top of its upward travel, thus locking the shaft into its upper valve release position, as will be explained in more detail hereinafter. A transverse slot 42 disposed in shaft 13 allows for the transverse movement of pin 27 in guide slot 40.

Collar 20 forms part of a valve section 28 that is fitted into the air-brake pressure line conduit 17 by means of sealed couplings 29.

The skip-jack uses a two-way pneumatic safety valve piston 22, which gradually bleeds-off the air pressure in the brake line. The piston valve 22 is normally closed but has an outlet, port 50. The port size will determine the volume rate of the air flow. This can be configured to provide the best average bleed-off with respect to train speed.

In an alternate embodiment, a plurality of removable, porous, sponge-like filters are inserted into the hollow shaft 13, which will provide an exact predetermined control over the air pressure drop in the brake line.

In operation, the safety device 11 is caused to actuate the air-brake system when the skip-jack 14 momentarily contacts the rail 15, as will result when there is a derailment of the railway car in which the safety device 11 is attached to the bottom 12 thereof.

When the car 10 is caused to derail, shaft 13 is forced upward (arrow 25) against the biasing of spring 30. After pin 27 moves a distance of approximately two inches, it will lock in an open position as guide pin 27 enters locking aperture 41. The upward movement of the guide pin 27 must be captured and locked in the open position at this time, since the contact of the skip-jack stirrup 14 with the rail 15 is only momentary. The piston end 22 of shaft 13 will enter air line 17, exposing the outlet port 50. This will cause air pressure in air-brake conduit 17 to escape through outlet port 50 with a pre-determined, gradual rate of flow.

Figure 5:
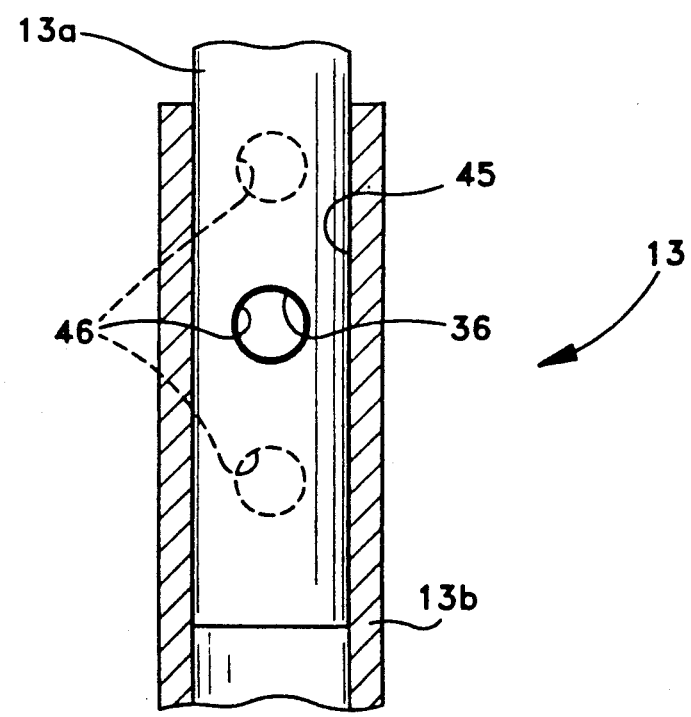
FIG. 5 is a schematic side view of a mid-portion of the shaft of the skip-jack extension safety device of the invention, as depicted in FIG. 3.

Referring to FIG. 5, a mid-portion of shaft 13 is shown in more detail. The shaft 13 has two sections, 13a and 13b, to provide a telescoping adjustment for shaft 13. Shaft section 13a slides within the hollow wall 45 of shaft section 13b. Shaft section 13a has a plurality of equally spaced holes 46 that align with the central aperture 36 disposed in the outer shaft section 13b, in which shaft section 13a is made to slide. A pin (not shown) is placed through central aperture 36 and one of the holes 46. In this fashion, different lengths of shaft 13 can be selected in a telescoping manner to accommodate different heights of various cars (e.g., tanker, subway, passenger), relative to the rail. The pin (not shown) in central aperture 36 and holes 46 may be frangible to shear, as further protection of the valve conduit section 28 (FIG. 3).

Figure 6:
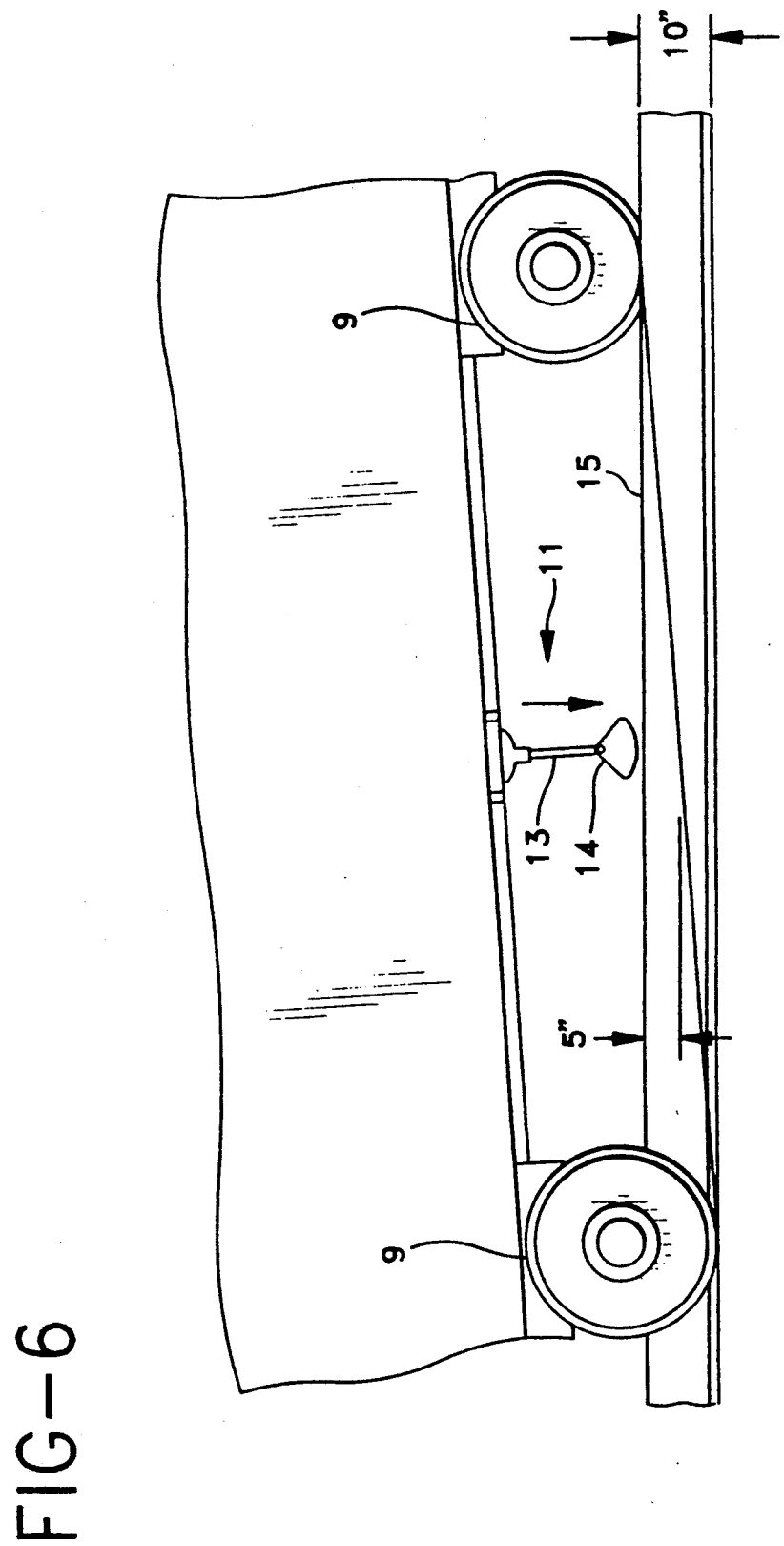
FIG. 6 is a schematic side view similar to FIG. 1, but one which demonstrates displacement of a derailed wheel and the skip-jack of the invention in relation to the rail.

Referring now to FIG. 6, there is shown a schematic side view of two wheels 9 and a ten-inch-high rail 15. The rightmost wheel 9 is disposed in its proper orientation, above rail 15 and supported thereby. The leftmost wheel 9, however, has been derailed in this FIGURE. When one of the wheels remains in its nominal position and the other is derailed, the mid-way point of the two wheels 9 having the skip-jack 11 will drop five inches to contact the top of rail 15. When skip-jack 11 drops or attempts to drop five inches, the first four inches of fall are unimpeded, but contact is made with the rail 15 at the last inch of travel.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A railway safety device in operative engagement with a railway car air-brake system for actuating the air-brake system upon derailment of said railway car, and for gradually decreasing air pressure in said air-brake system, comprising:
    an elongated extension disposed below a railway car and operatively disposed within an air pressure conduit of an air-brake safety system of said railway car;
    a gradual, controlled air release trip valve mechanism disposed within said air pressure conduit, said trip valve mechanism being movable between a sealed position within said air pressure conduit and an unsealed position for gradually releasing air in said air pressure conduit at a predetermined, controlled rate of flow;
    biasing means disposed adjacent said gradual, controlled air release trip valve mechanism for urging said gradual, controlled air release trip valve mechanism into its sealed position; and
    guide means for guiding said elongated extension into contact with said gradual, controlled air release trip valve mechanism for forcing said gradual, controlled air release trip valve mechanism into its unsealed position to gradually release air pressure in said air pressure conduit at a predetermined rate of flow when the railway car is caused to derail and said elongated extension is caused to contact a rail.

2. The railway safety device of claim 1, wherein said elongated extension comprises a skip-jack disposed a few inches above a rail of said railway system.

3. The railway safety device of claim 2, wherein said skip-jack is pivotally mounted to said elongated extension.

4. The railway safety device of claim 1, wherein said biasing means comprises a coil spring directed against said gradual, controlled air release trip valve mechanism for urging said gradual, controlled air release trip valve mechanism into a seated, sealed position.

5. The railway safety device of claim 1, wherein said gradual, controlled air release trip valve is disposed within said air pressure conduit of said air-brake system and is sealed therein by means of sealed couplings.

6. A railway safety device in operative engagement with a railway car air-brake system for actuating the air-brake system upon derailment of said railway car, and for gradually reducing air pressure in said air-brake system at a controlled air flow rate, comprising:
    an elongated bar extension disposed below the bottom of a railway car and operatively engagable with an air pressure conduit of an air-brake safety system of said railway car, said bar extension located above a rail of a railway system and designed to impact against said rail upon a derailment of said railway car;
    a gradual, controlled air release trip valve mechanism disposed within said air pressure conduit, said gradual, controlled air release trip valve mechanism being movable between a sealed position within said air pressure conduit and an unsealed position;
    biasing means disposed adjacent said gradual, controlled air release trip valve mechanism for urging said gradual, controlled air release trip valve mechanism into its sealed position; and
    guide means for guiding said elongated bar extension into contact with said gradual, controlled air release trip valve mechanism for forcing said gradual, controlled air release trip valve mechanism into its unsealed position to gradually release air pressure in said air pressure conduit at a controlled rate, when the railway car is caused to derail and said elongated bar extension is caused to contact said rail.

7. The railway safety device of claim 6, wherein said bar extension comprises a skip-jack extending across and above said railway system rail.

8. The railway safety device of claim 7, wherein said skip-jack extends substantially perpendicular to said rail.

9. The railway safety device of claim 7, wherein said skip-jack extends at least five inches above said rail.

10. The railway safety device of claim 6, wherein said biasing means comprises a coil spring directed against said gradual, controlled air release trip valve mechanism for urging said gradual, controlled air release trip valve mechanism into a seated, sealed position.

11. The railway safety device of claim 6, wherein said gradual, controlled air release trip valve is disposed within said air pressure conduit of said air-brake system and is sealed therein by means of sealed couplings.

12. A railway safety device in operative engagement with a railway car air-brake system for actuating the air-brake system upon derailment of said railway car, and for gradually decreasing air pressure in said air-brake system, comprising:

an elongated extension disposed below a railway car and operatively disposed within an air pressure conduit of an air-brake safety system of said railway car;

a trip valve mechanism disposed within said air pressure conduit, said trip valve mechanism being movable between a sealed position within said air pressure conduit and a unsealed position;

biasing means disposed adjacent said trip valve mechanism for urging said trip valve mechanism into its sealed position;

guide means for guiding said elongated extension into contact with said trip valve mechanism for forcing said trip valve mechanism into its unsealed position to gradually release air pressure in said air pressure conduit when the railway car is caused to derail and said elongated extension is caused to contact a rail;

means defining a guide slot disposed in said guide means, said guide slot for receiving a safety release pin, and having a locking aperture for locking upward travel of the safety release pin; and a safety release pin removably disposed in said elongated extension and extending through to said guide means, said safety release pin disposed for upward movement in said guide slot as said elongated extension is forced upwardly during a derailment, said locking aperture capturing said safety release pin at its uppermost position, thus locking the elongated extension into an upper valve release position for unsealing said valve.

13. The railway safety device of claim 12, wherein said extension includes a skip-jack that extends approximately at least five inches above said rail.

14. The railway safety device of claim 12, wherein said biasing means comprises a coil spring directed against said trip valve mechanism for urging said trip valve mechanism into a seated, sealed position.

15. The railway safety device of claim 12, wherein said trip valve is disposed within said air pressure conduit of said air-brake system and is sealed therein by means of sealed couplings.

16. A railway safety device in operative engagement with a railway car air-brake system for actuating the air-brake system upon derailment of said railway car, and for gradually reducing air pressure in said air-brake system, comprising:

detection means comprising an elongated bar extension disposed below the bottom of a railway car and operatively engageable with an air pressure conduit of an air-brake safety system of said railway car, said detection means located above a rail of a railway system and designed to impact against said rail upon a derailment of said railway car;

a trip valve mechanism disposed within said air pressure conduit, said trip valve mechanism being movable between a sealed position within said air pressure conduit and an unsealed position;

biasing means disposed adjacent said trip valve mechanism for urging said trip valve mechanism into its sealed position;

guide means for guiding said elongated bar extension into contact with said trip valve mechanism for forcing said trip valve mechanism into its unsealed position to gradually release air pressure in said air pressure conduit when the railway car is caused to derail and said elongated bar extension is caused to contact said rail;

means defining a guide slot disposed in said air guide means, said guide slot for receiving a safety release pin and having a locking aperture for limiting upward motion of the safety release pin; and a safety release pin removably disposed in said elongated bar extension and extending through to said guide means, said safety release pin disposed for upward movement in said guide slot as said elongated bar extension is forced upwardly during a derailment, said locking aperture capturing said safety release pin at its uppermost position, thus locking the elongated extension into an upper trip valve mechanism release position for unsealing said trip valve mechanism.

17. The railway safety device in accordance with claim 16, wherein said pressure releasing means comprises a trip valve operatively disposed within a portion of said air-brake conduit system.

18. The railway safety device in accordance with claim 17, wherein said trip valve is spring-biased into a closed, sealed position, and further wherein said pressure releasing means further comprises means to urge said trip valve to an open, unsealed position against the spring biasing upon actuation by said detection means.

19. The railway safety device in accordance with claim 16, wherein said elongated extension is positioned adjacent said pressure releasing means on one end thereof, and positioned adjacent a rail of said railway on an opposite distal end thereof, whereby a derailment will cause said detection means to engage said rail and actuate said pressure releasing means.

20. The railway safety device in accordance with claim 18, wherein said elongated extension is positioned adjacent said pressure releasing means on one end thereof, and positioned adjacent a rail of said railway on an opposite distal end thereof, whereby a derailment will cause said detection means to engage said rail and move said trip valve to an open, unsealed position.

* * * * *